United States Patent [19]
Keppel et al.

[11] Patent Number: 5,551,587
[45] Date of Patent: Sep. 3, 1996

[54] MULTILAYER MIRROR WITH A VARIABLE REFRACTIVE INDEX

[75] Inventors: Anton Keppel, Heiloo; Rutger Schlatmann, Amsterdam; Jan Verhoeven, Kockengen, all of Netherlands

[73] Assignee: U.S. Philips Corporation, New York, N.Y.

[21] Appl. No.: 319,181

[22] Filed: Oct. 6, 1994

[51] Int. Cl.⁶ .................................................. B44C 1/22
[52] U.S. Cl. .......................................... 216/24; 216/66
[58] Field of Search ................... 250/505.1; 216/24, 216/60, 66

[56] References Cited

FOREIGN PATENT DOCUMENTS 9002964  3/1990  WIPO .

OTHER PUBLICATIONS

E. J. Puik et al., "Ion bombardment of thin layers: The effect on the interface roughness and its x-ray reflectivity (invited)", Rev. Sci. Instrum. 63, Jan. 1992, American Institute of Physics, pp. 1415–1419.

E. J. Puik et al., "Ion etching of thin W layers: enhanced reflectivity of W–C multilayer coatings", Applied surface Science 47, 1991, pp. 63–76.

R. Schlatmann et al., "Limits to Ion Beam etching of Mo/Si multilayer coatings", Proceedings of "Physics of X–ray Multilayer Structures", Technical Digest Services, vol. 7.

*Primary Examiner*—William Powell
*Attorney, Agent, or Firm*—Leroy Eason

[57] ABSTRACT

A method of manufacturing multilayer mirrors for use in conjunction with X-rays. Customary multilayer mirrors are composed of discrete, thin layers which generally consist of alternating absorption and spacer layers. In order to counteract surface roughness of the thin layers, it is known to smoothen the layers by ion etching after deposition. A drawback thereof consists in that the material of one layer penetrates into the other layer, so that the location of the interface and the thickness of the layers of the multilayer mirror are no longer suitably defined. In accordance with the invention, a multilayer mirror is manufactured by stimulating the penetration of one of the materials into the layer with the other material, after which the original layer thickness of the first material is removed by etching. By repeating this process one layer after the other, a multilayer mirror is obtained which does not consist of an alternation of uniform, discrete layers of a different material but of recurrent layers of one of the materials in which the other material has penetrated.

4 Claims, 2 Drawing Sheets

MULTILAYER MIRROR WITH A VARIABLE REFRACTIVE INDEX

BACKGROUND OF THE INVENTION

1. Field of the Invention

The invention relates to a method of manufacturing multilayer mirrors, in which a first layer of a first material and of a first thickness is deposited on a substrate, a second layer of a second material and of a second thickness being deposited on the first layer, and material being removed from the second layer by ion-etching the material by ion bombardment, the foregoing steps being repeated at least once.

The invention also relates to a multilayer mirror manufactured by means of the method of the invention.

2. Description of the Related Art

A method of this kind is disclosed in an article "Ion etching of thin W-layers: enhanced reflectivity of W-C multilayer coatings", Applied Surface Science 47 (1991), (Elsevier Science Publishers, North-Holland), pp. 63 to 76.

The term "multilayer mirror" is to be understood to mean not only a multilayer mirror which is used in the visible part of the spectrum of electromagnetic radiation, but also in other (notably shortwave) parts thereof, or for reflection of elementary particles such as neutrons.

Known multilayer mirrors are manufactured by providing materials with two different refractive indices on one another by physical deposition. The reflectivity of one interface between such layers for electromagnetic radiation in a wavelength range smaller than, for example, 50 nm amounts to some tenths of a percent for angles larger than the critical angle. Reflection of electromagnetic radiation by a multilayer mirror is based on interference between radiation reflected at the many interfaces of the multilayer mirror, and is suitably approximated by the known Bragg relation. Therefore, this reflection is of a dispersive nature. For reflection angles larger than the critical angle, reflection amounting to some tens of percents can thus be obtained. Multilayer mirrors are thus used to provide high reflectivity at large angles relative to the surface of the layers and can also be used as dispersive elements because of their dispersive nature. A multilayer mirror for the reflection of shortwave radiation consists of successive periods of each time two layers of materials of a different refractive index and of a thickness of the order of magnitude of the wavelength of the reflected radiation. For shortwave radiation a difference in refractive index can be considered as a difference in density, i.e. the atomic number.

The total reflectivity of a multilayer mirror is determined by the magnitude of the reflection per interface, i.e. by the difference in refractive index. A large difference in refractive index implies that one of the materials should have a high density; it is an inevitable consequence thereof that the relevant layer has a low transparency for the reflected radiation. This means that only a limited number of bilayer periods can be used to contribute to the total reflected radiation.

Because the reflection, as has already been stated, is of a dispersive nature, these multilayer mirrors can also be used as dispersive elements. The wavelength resolution is proportional to the number of bilayer periods in the multilayer mirror participating in the total reflection. Absorption of electromagnetic radiation in the layers of high density thus imposes a limit as regards the wavelength resolution.

Another problem encountered in the manufacture of multilayer mirrors resides in the roughness of the interfaces between the layers. For optimum reflectivity of a multilayer system, the roughness of the interfaces should not be greater than the dimensions of the atoms of the deposited material ($\approx 0.2$ nm). Roughness is more important as the bilayer period is smaller. Roughness of an interface is introduced in the form of surface roughness during the deposition process of the materials. When a next layer is deposited, the roughness of the surface of this layer may increase. For layer thicknesses of less than 3 nm the roughness may take the form of islands, so that not even a closed layer is grown. For systems with a small period or systems with a larger period whose metal layer thickness must be very small for reasons of absorption (i.e. <2 nm), it is very likely not only that roughness of the successive interfaces occurs, but also that the formation of islands inhibits the formation of a closed layer.

The cited article describes the manufacture of multilayer mirrors in which the first one of the successive layers consists of carbon and the second layer consists of tungsten. These layers are provided one on the other by electron beam vapour deposition. The layer thickness of each of the two layers is of the order of magnitude of 1.5 nm. The cited article describes that the surface roughness of the layers can be counteracted by ion etching of the second layer. The bilayer period is adjusted to the correct thickness and surface roughnesses are removed by the growth of additional tungsten, followed by the removal by etching of this additional layer with 200 eV argon ions. It has been demonstrated that the surface of the top layer is smoothed by ion bombardment, but also that mixing of the layers around the interface may occur. This problem is described, for example in an article "Limits to Ion Beam Etching of Mo/Si multilayer coatings", Proceedings of "Physics of X-ray Multilayer Structures", Technical Digest Services, Vol. 7. Briefly speaking, this problem consists in that the ion bombardment drives a part of the material of the upper layer, exposed to the etching operation, into the layer situated therebelow. This gives rise to an undesirable situation which is comparable to severe interface roughness.

SUMMARY OF THE INVENTION

It is an object of the invention to provide multilayer mirrors and a method of manufacturing such mirrors in which the layers exhibit suitable smoothness without openings in the layers, and in which a large number of layers can participate in the reflection because said limiting absorption has been reduced.

To achieve this, the method of the invention is characterized in that the ion bombardment of the second layer is sustained upon each repeat until an amount of material equal to the second layer thickness has been removed.

The invention is based on the idea that the effect of mixing of the layers around the interfaces can actually be utilized to manufacture multilayer mirrors which satisfy the requirements specified in the above object. A minimum absorption of the multilayer mirror in accordance with the invention is achieved by complete removal of the original layer by etching. Reflection still occurs because material from the upper layer will still be present in the lower layer with a given density gradient perpendicular to the layers.

The method of deposition is not relevant to the process in accordance with the invention. Use can be made of sputter deposition, vapour deposition or laser ablation. It is essential only that the layer thicknesses of the materials can be accurately determined after growth and removal by etching; this is quite well feasible because the growth process and the etching process can be suitably controlled.

Experiments using the method of the invention have demonstrated that this technique enables the manufacture of layers which are sufficiently smooth, do not exhibit openings and have a periodicity of less than 1 nm.

It is advantageous for the deposition and etching process to be suitably controllable. It is feasible to choose values for a variety of parameters which are subsequently kept constant during the process. By calibration it can then be achieved that the process is completed as desired. An attractive version of the invention offers a method of process control which enables the process to be monitored very closely and varied, if necessary. This version is characterized in that the layer deposition and ion etching processes are controlled by means of X-ray interference on the multilayer mirror being built up. Using this known technique, a process step can be started or terminated exactly at an interference minimum or maximum.

The invention offers the advantage that multilayer mirrors which satisfy special optical requirements can be readily manufactured. One of the types of layer in these multilayer mirrors contains a material having an atomic number which is lower than the atomic number of material in the other type of layer. A version of such a method of manufacturing such a mirror is characterized in that the thickness of each of the layers of material having the low atomic number is variable in dependence on the ordinal position number of such layer in the entire multilayer.

As has already been stated, the method of deposition is not essential to the process in accordance with the invention. At least one of the types of layer can be provided by electron beam vapour deposition. In that case the layer deposition and ion etching process can be controlled by means of the beam current of the electron beam and/or the energy of the etching ions of the ion etching operation and/or the time during which each of these processes is carried out and/or the ion current. A version of the invention is characterized in that one or more of these quantities is variable in dependence on the ordinal position number of the layer to be treated. A high degree of freedom is thus achieved in respect of the variation of the refractive index profile of the various layers.

BRIEF DESCRIPTION OF THE DRAWINGS

The invention and its advantages will be described in detail hereinafter with reference to the drawing Figures, in which corresponding reference numerals denote corresponding elements.

Therein.

DESCRIPTION OF THE PREFERRED EMBODIMENT

Figure 1:
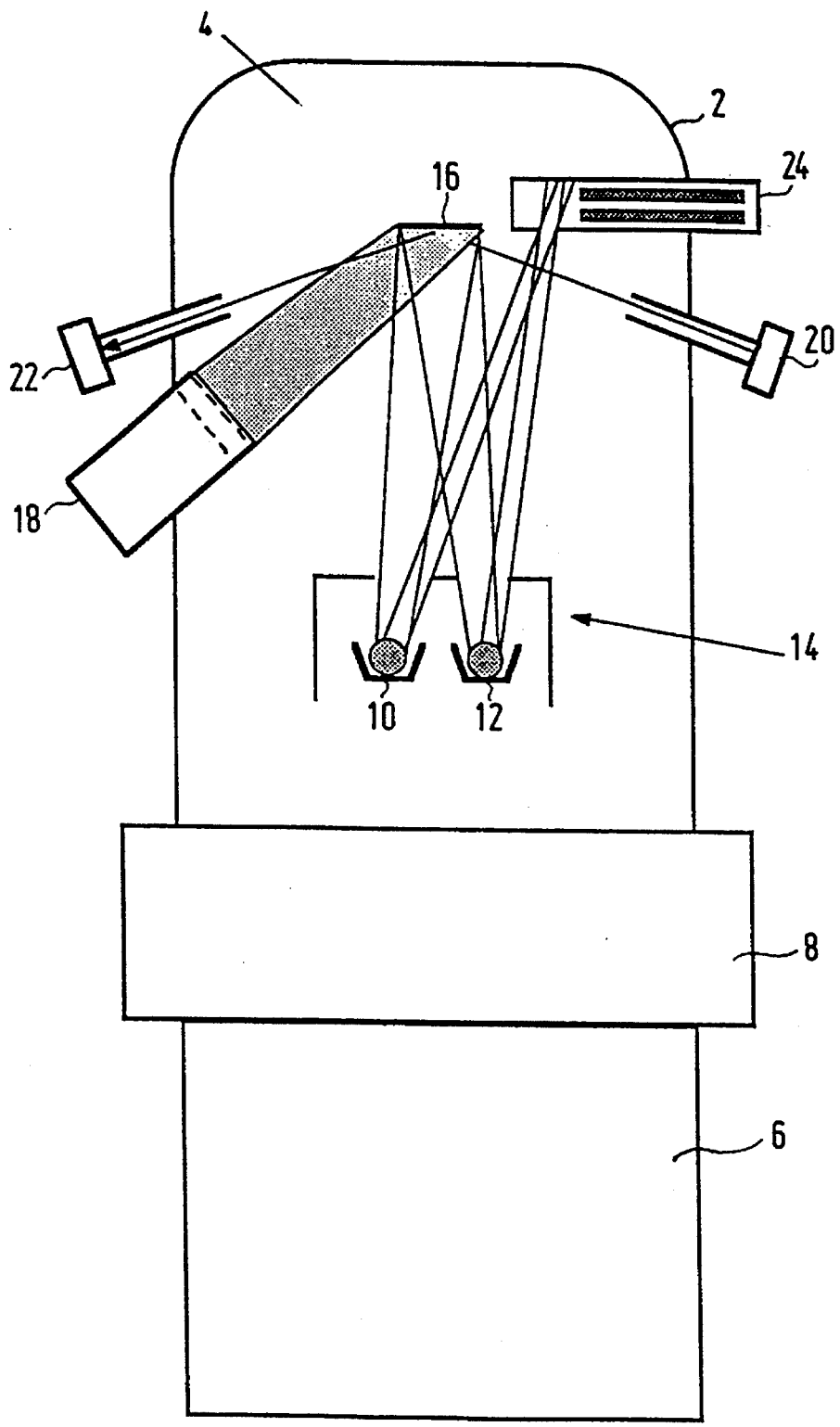
FIG. 1 shows a vapour deposition device for manufacturing multilayer mirrors in accordance with the invention.

The vapour deposition device shown in FIG. 1 comprises an evacuated space 4 within an envelope 2 which is arranged on a carrier 8. The space is evacuated by means of a vacuum pump 6. The material to be evaporated is present in holders 10 and 12 which are surrounded by a shroud 14. Evaporation of the material takes place by heating the holders in known manner, for example by electron beam heating. Above the holders there is arranged a substrate 16 on which the evaporated material is deposited. Also present is an ion source 18 for generating an ion beam for etching off material deposited on the substrate 16. Any ion source of adequate intensity can be chosen for this source, for example a so-called Kaufman ion source. The process of vapour deposition and etching off can be monitored by means of an X-ray system consisting of an X-ray source 20 and an X-ray detector 22. The X-ray source is operative to generate nitrogen $K_\alpha$ radiation. The process can also be monitored by means of a four-pole detector 24 for determining the density of vapour of the material. The latter detector can be calibrated on the basis of the variation of the layer thickness, in dependence on time, to be described hereinafter, thus enabling automation of the vapour deposition process. This four-pole detector is not of essential importance to the execution of the method.

Figure 2:
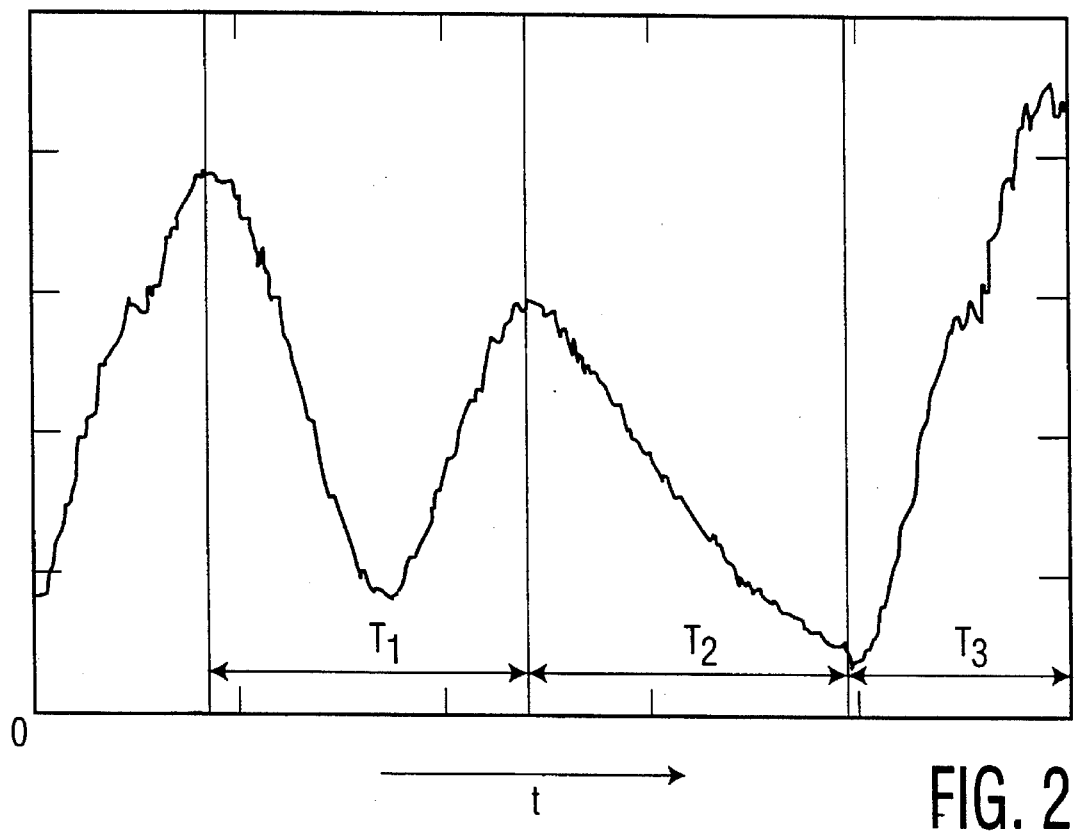
FIG. 2 shows the variation of the reflected X-ray intensity from the multilayer mirror from the beginning of the deposition and etching process during the manufacture.

It is assumed that a multilayer mirror consisting of alternating layers of silicon (Si) and molybdenum (Mo) is to be manufactured. The process commences with alignment of the specimen relative to the X-ray source 20 and the X-ray detector 22, so that a suitably visible pattern of interference minima and maxima can be observed during growth of the multilayer mirror. Subsequently, a first layer Si is vapour deposited, the signal of the X-ray detector 22 then increasing from an arbitrary value to a maximum, subsequently decreases to a minimum and then increases to a maximum again. The variation of this signal is shown in FIG. 2 in which the time interval between the two said maxima is denoted by the reference T1. After the occurrence of these two maxima, it is certain that the first layer of Si has reached the correct thickness. Subsequently, a layer of Mo is vapour deposited until the signal of the X-ray detector exhibits a minimum again (interval T2 in FIG. 2). It is then certain that a sufficient amount of Mo has been vapour deposited, so that removal of the Mo layer by etching by means of the ion source may commence. Etching off is performed by means of krypton ions (Kr) with an energy of 300 eV. This process is continued until a detector signal has reached a maximum again (interval T3 in FIG. 2). The originally deposited layer of Mo has then been removed and the cycle consisting of deposition of Si and Mo and removal of Mo by etching can be repeated. It is to be noted that the maximum after the removal of the Mo layer is higher than the maximum observed prior to the deposition of Mo. The reflective effect of the Mo having penetrated the layer of Si is thus rendered observable.

Figure 3:
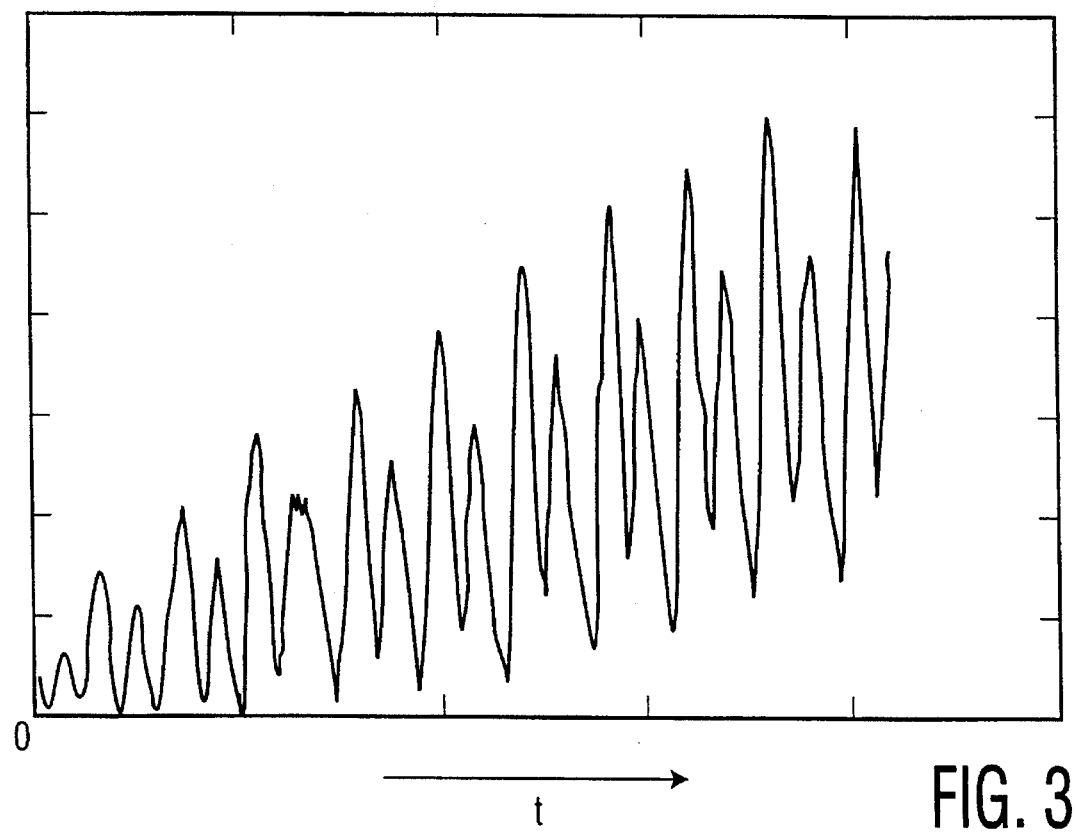
FIG. 3 shows the variation of the reflected X-ray intensity from the multilayer mirror over a number of periods during the manufacture.

FIG. 3 shows a large number of cycles of the process in accordance with the invention. The Figure clearly shows that the reflectivity (i.e. the variation of the maxima of the X-ray reflection) increases as the number of deposited layers increases.

We claim:

1. A method of manufacturing multilayer mirrors, in which:

a first layer of a first material and of a first thickness is deposited on a substrate;

a second layer of a second material and of a second thickness is deposited on the first layer;

material is removed from the second layer by ion-etching the material by ion bombardment; and the foregoing steps are repeated at least once again; characterized in that during each repeat the ion bombardment of the second layer is sustained until an amount of material equal to the second layer thickness has been removed, so that the first and second materials interface entirely within the first layer.

2. A method as claimed in claim 1, characterized in that the layer deposition and ion etching steps are monitored by detection of interference between X-ray radiation reflected at the interfaces within the multilayer mirror being built up.

3. A method as claimed in claim 1, in which one of the first and second materials has an atomic number which is lower than the atomic number of the other of said materials, and characterized in that the thickness of each layer of the material having the lower atomic number is controlled in dependence on the ordinal position number of such layer in the multilayer mirror being built up.

4. A method as claimed in claim 1, in which the layers of said second material are formed by electron beam vapor deposition, and the deposition and ion etching steps are controlled by controlling at least one of the parameters (i) beam current during the electron beam vapor deposition, (ii) ion energy during the ion etching, (iii) ion current during the ion etching, and (iv) durations of the deposition and ion etching steps; characterized in that control of the relevant parameters during formation of a layer is in dependence on the ordinal position number of such layer in the multilayer mirror being built up.

* * * * *